United States Patent [19]

Ueda et al.

[11] 4,340,799
[45] Jul. 20, 1982

[54] HEATING APPARATUS WITH VOICE ACTUATED DOOR OPENING MECHANISM

[76] Inventors: Shigeki Ueda, Nara; Teruhisa Takano, Osaka; Ryuji Suzuki, Nara, all of Japan

[21] Appl. No.: 217,684

[22] Filed: Dec. 18, 1980

[30] Foreign Application Priority Data

Dec. 21, 1979 [JP] Japan .................... 54-167405

[51] Int. Cl.³ .............................................. H05B 6/68
[52] U.S. Cl. .................. 219/10.55 C; 179/1 VC; 219/10.55 R; 219/10.55 B; 219/10.55 D
[58] Field of Search .................. 219/10.55 B, 10.55 C, 219/10.55 M, 10.55 R, 10.55 D; 179/1 VC

[56] References Cited

U.S. PATENT DOCUMENTS

| | | | |
|---|---|---|---|
| 3,286,031 | 11/1966 | Geddes | 179/1 VC X |
| 3,944,736 | 3/1976 | Shepard | 179/1 VC |
| 3,998,045 | 12/1976 | Lester | |
| 4,016,540 | 4/1977 | Hyatt | |
| 4,107,462 | 8/1978 | Asija | 179/1 VC |
| 4,158,759 | 6/1979 | Mason | 219/10.55 B |
| 4,190,756 | 2/1980 | Foerstner | |
| 4,232,210 | 11/1980 | Oida et al. | 219/10.55 C |

FOREIGN PATENT DOCUMENTS 2373117  8/1978  France .......................... 179/1 VC

OTHER PUBLICATIONS

Walker, G. M. *L.S.I. Controls Gaining In Home Appliances,* Electronics, Apr. 14, 1977, vol. 50, No. 8, pp. 91-99.

*Primary Examiner*—Arthur T. Grimley
*Attorney, Agent, or Firm*—Cushman, Darby & Cushman

[57] ABSTRACT

A heating apparatus, such as an electric oven or a microwave oven, comprises an enclosure case having therein a heating chamber to place a heating object therein, the enclosure case having a door at an opening of the chamber, and the door having a locking means, to lock the door when closed, and has a door lock releasing means, such as a lever and a solenoid planger, to release and open the door from the locking state of the locking means, a voice recognition circuit for recognizing voice commands of a user of the apparatus and produces at least a control signal, which drives the releasing means to open the door.

4 Claims, 14 Drawing Figures ($V_{in}$)

Time →

($V_{BPF}$)

Time →

($V_F$)

T

Time →

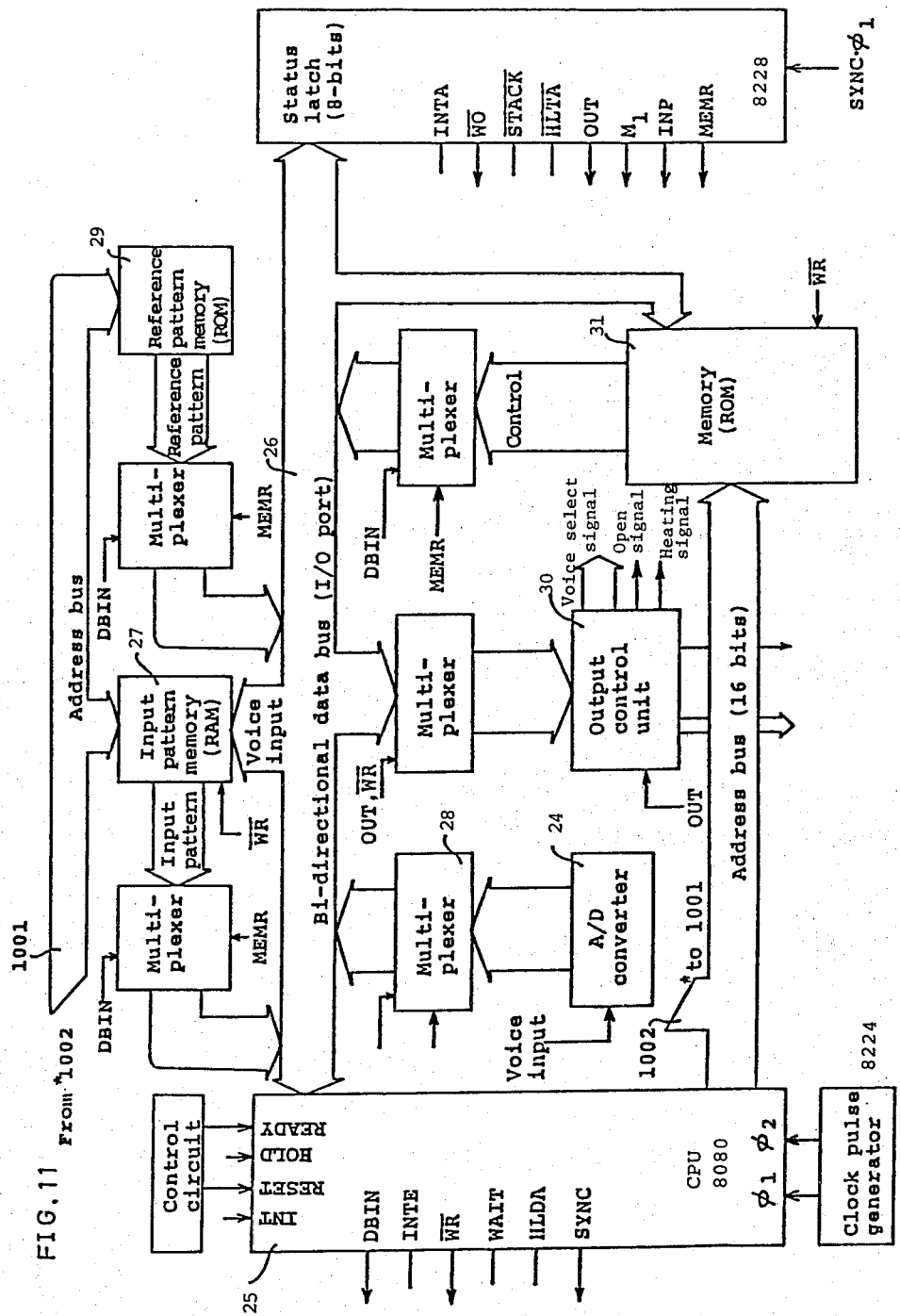

HEATING APPARATUS WITH VOICE ACTUATED DOOR OPENING MECHANISM

This application is directed to subject matter that is related to the subject matter of the following co-pending U.S. patent applications all filed on Dec. 18, 1980: Ueda et al. Ser. No. 217,653; Takano et al. Ser. No. 217,651; and Ueda et al. Ser. No. 217,685.

BACKGROUND OF THE INVENTION

1. Field of the Invention

The present invention relates to a heating apparatus to which a command to open the door can be given by voice instead of opening action of a hand operation or a foot operation.

2. Prior Art

Generally, in a use of a heating apparatus, user's hands are occupied in holding an object to be heated when the user wishes to open a door of a heating chamber of the heating apparatus. Especially for a large or heavy heating object, the user must put down the heating object on the table or other stand near the apparatus, to free his hands to open the door of the heating chamber. Then the door is opened by a hand and the user puts the heating object into the heating chamber by again holding the heating object again with both hands. Hence, there has been for a long time a desire to open the door without hand operation or foot operation.

Generally speaking in the heating operation, the door temperature of the heating apparatus rises up to a fairly high level, and so there is a danger of burn caused by an inadvertent touch to the heated door when the user opens the door to inspect heating progress. In microwave heating apparatus, the microwave is automatically cut off by a door switch linked thereto to open at an opening motion of the door. But, even with the use of such measure, it is difficult to prevent a leak of the microwave occurring for a short time between the opening action of the door and the cut off action of the door switch. So it is desired that the door of the heating apparatus can be opened by the remote control operation with the user far from the door.

Recently, studies have been made to introduce recorded voice, letters or words, signs or picture for use in inputting commands to an electronics system, in order to attain easier and more natural interaction between the user and the apparatus. Especially, use of voice are attracting much attention as a most natural communication medium between man and machine, and the use of the voice in the apparatus becomes more and more practical as the semiconductor technology develops by increasing the memory capacity of integrated circuits through higher density integrations, and through the use of the microcomputer as a controlling unit, etc.

SUMMARY OF THE INVENTION

The present invention provides a heating apparatus capable of, instead of a hand operation or a foot operation, opening its door in response to a voice commands. In the apparatus, a microphone as a voice command receiving unit is a type to be used close to the mouth and have a sharp directivity, and disposed at a predetermined side position of the enclosure case so as to receive a voice command given by the user standing only at the predetermined side position of the apparatus, so as to prevent the user from being struck by the door when it opens.

BRIEF DESCRIPTION OF THE DRAWINGS

FIG. 11 is a block diagram of the structure of a CPU (central processing unit) of the circuit of FIG. 5.

DESCRIPTION OF THE PREFERRED EMBODIMENT

Figure 1:
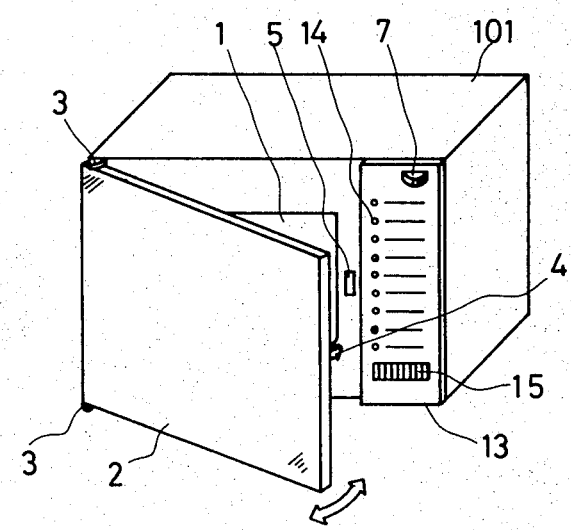
FIG. 1 is a perspective view of a heating apparatus embodying the present invention.

The construction of present invention is described hereinafter referring to the drawing, which shows preferred embodiments of the present invention.

FIG. 1 is a perspective view of a heating apparatus embodying the present invention.

In FIG. 1, the enclosure case 101 comprises a heating chamber 1 wherein an object to be heated such as food is to be placed. The heating chamber 1 has a door 2 mounted by hinges 3 at one side thereof, for example, at the left side portion of the enclosure case 101, and the door 2 may move in a direction as shown by an arrow in FIG. 1. A door lock 4 is provided at the right side portion of the door 2 and disposed so as to thrust into a lock hole 5 bored in the enclosure case 101.

The apparatus comprises a built-in microphone 7 and a built-in speaker 15 on operation panel 13 which has a row of sequence indication lamps 14. And the built-in microphone constitutes an input part of the voice command input means.

Figure 2A:
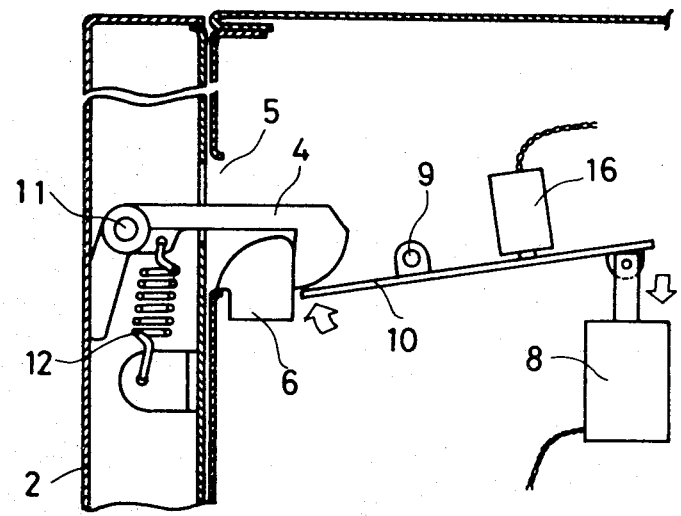
FIGS. 2(a) and (b) are partially sectional plan view of a part of the apparatus of FIG. 1.
Figure 2B:
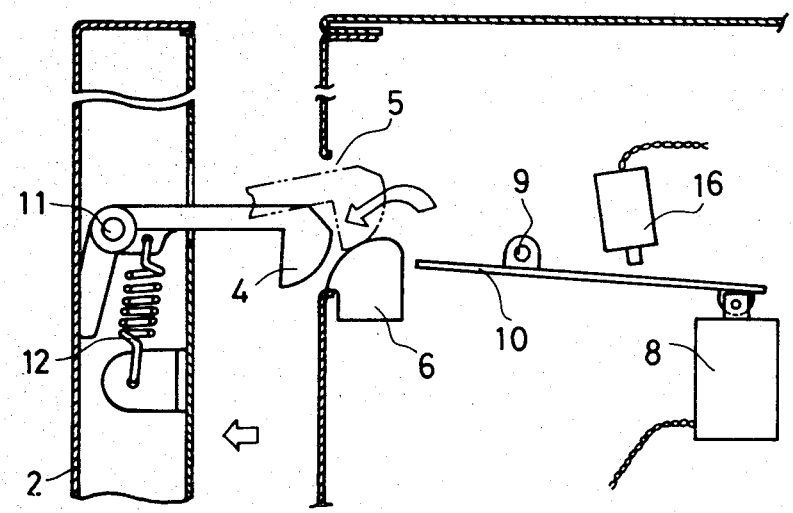

FIGS. 2(a) and 2(b) are partially sectional plan view of the apparatus of FIG. 1, wherein FIG. 2(a) shows the state with a door closed and FIG. 2(b) shows a state with the door opened.

Now let us describe a sequence of heating operation referring to FIGS. 2(a) and 2(b). At first, the user tells the voice command to open the door such as "OPEN DOOR". When the voice command is clearly recognized by a voice command recognition circuit which will be elucidated later, a control signal to open the door is issued from a control circuit. Then a pulling means 8 or a torque motor such as a solenoid plunger acts to pull a right end of a lever 10 in FIG. 2(a) to turn the lever to a direction of arrow "Op" around a pivot pin 9. Therefore a left end portion of the lever 10 pushes up the door lock 4. The door lock 4 is held by a pivot pin 11 in the door 2 and is pulled downwards by a spring 12 in the door panel to hook with a lock element 6 fixed to the enclosure case 101. Accordingly, when the door lock 4 is pushed up by the lever 10, the door lock 4 is released from the lock element 6 and slips down along a curvature of the lock element 6. As a result of a reaction of a door lock motion at the slipping down motion, the door 2 is pushed forward as shown by an arrow F.

After opening the door by the voice command, the user puts an object to be heated into the heating chamber 1 and closes the door by hand operation, and then the heating preparation is set. Now the user select a heating pattern and tells it by voice command such as "HEAT TWO", which means heating sequence No. 2, then a heating sequence corresponding to the commanded pattern is set into a control system. The heating sequences are designed considering various heating conditions such as output of the heating source, heating temperature, heating time, etc., and combinations thereof and stored in the memory. Any suitable one of sequences stored in memory of the control system may be selected.

A recognized heating pattern is indicated by an indication lamp on the operation panel 13.

In addition, use of an automatic heating apparatus having various sensors such as a humidity sensor or a gas sensor to control a heating operation can effectively diminish the number of words which has to be recognized.

Upon receiving a voice command to start a heating operation such as "START TO HEAT", the apparatus starts the heating process. The voice command is recognized by the recognition circuit which has been used to recognize the previous voice command of "OPEN DOOR". The voice commands to be recognized are once memorized and pattern-analyzed. And data of input signal of the voice command is compared with the preliminary stored pattern-analyzed data of the reference signals of such command as "OPEN DOOR", "HEAT TWO", "START TO HEAT", etc.

On the other hand, there is a possibility that the door 2 may be opened by erroneous recognition of a voice command, and hence, there is a possibility of a danger that the user is struck by the opening door 2 when the user stands in front of the door 2. A voice synthsizing circuit is provided for preventing this danger. When a voice command to open the door is recognized by the voice recognizing circuit, the voice synthesizing circuit issues a voice alarm "DOOR OPENS" from a speaker 15. The door is opened only after the voice alarm is issued, giving the user an opportunity to stand clear so that the door 2 can be opened safely, preventing the user from being struck by the door and possibly dropping his hold of the object to be heated.

In addition, man-machine communication is further facilitated by using the voice synthesizing circuit to inquire of the user's by asking "DOOR OPEN?", and receiving the user's answer "YES" to open the door. When receiving the answer "NO" or receiving no response during a preset interval, the door does not open, and a previous recognition of an opening command is cancelled and the aparatus awaits a new command. Using this man-machine communication, the probability of erroneous operation of the heating apparatus may be diminished significantly even though there is some small probability of an erroneous recognition by the voice recognition circuit. That is, only when one of the predetermined voice command sequence (i.e.; "DOOR OPEN", ". . . ", "YES") is received, the operation of actual opening of door is made, and hence, there is only little probability of an erroneous operation responsive to an erroneous sequence of a voice command.

In FIGS. 2(a) and 2(b), a safety switch 16 (a door switch) acts depending on the motion of the lever 10. Safety switch 16 controls a load current by ON-OFF action thereof, therefore the current supplied to the micro-wave generating means or to the heating means is cut off certainly and safely.

Figure 3:
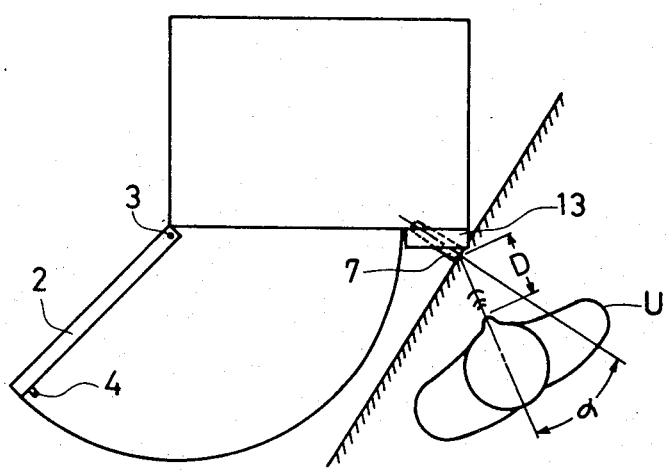
FIG. 3 is a plan view of the apparatus and the user.
Figure 4:
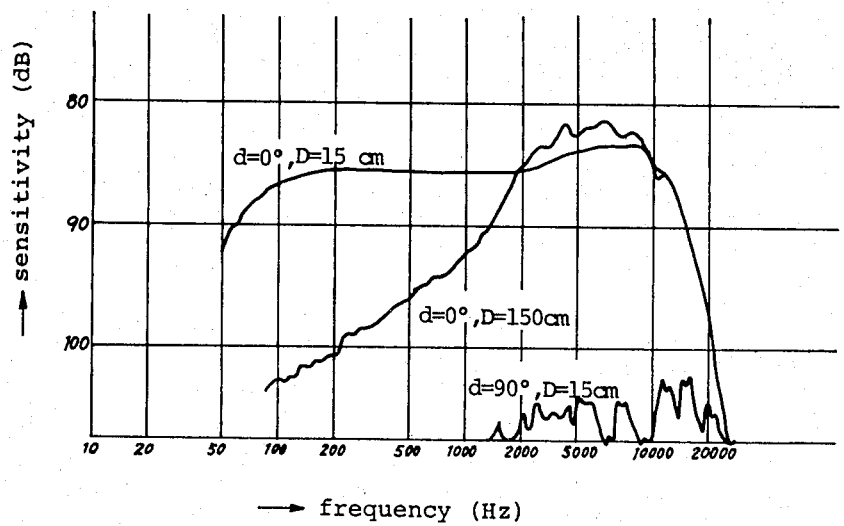
FIG. 4 is a graph of frequency characteristics of the microphone of the apparatus.

FIG. 3 is a plan view of the apparatus and the user. In FIG. 3, the microphone 7 is disposed on the right end of the operation panel 13 protruding from the operation panel with its directivity deflected to the right side of the apparatus. And the user U is standing at a distance D from a head of the microphone 7, and faces the microphone 7 with an angle $\alpha$ to the axis thereof. A graph of frequency characteristic of the microphone 7 is shown in the FIG. 4. The the microphone is designed to have a relatively sharp directivity. Therefore, in the abovementioned structure of the apparatus, the user needs to tell a voice command to the apparatus from a predetermined direction which is deflected towards right side of the enclosure case 101. That is, in order to give a clear voice command the user needs to stand at the right side of the apparatus.

When the user stands within a turning radius of the door motion and in the position of $\alpha \approx 90°$, the microphone cannot receive the voice command because the S/N ratio is not enough. Thus, selecting the directivity and the location of the microphone, the danger that the user is struck by the door is effectively avoided. And further, adopting a microphone with a sharp directivity as above mentioned, the noise outside of the directivity zone of the microphone is effectively reduced, and the audio noise other than the voice command is suppressed.

The following is an explanation of the circuit structure of the present invention.

Figure 5:
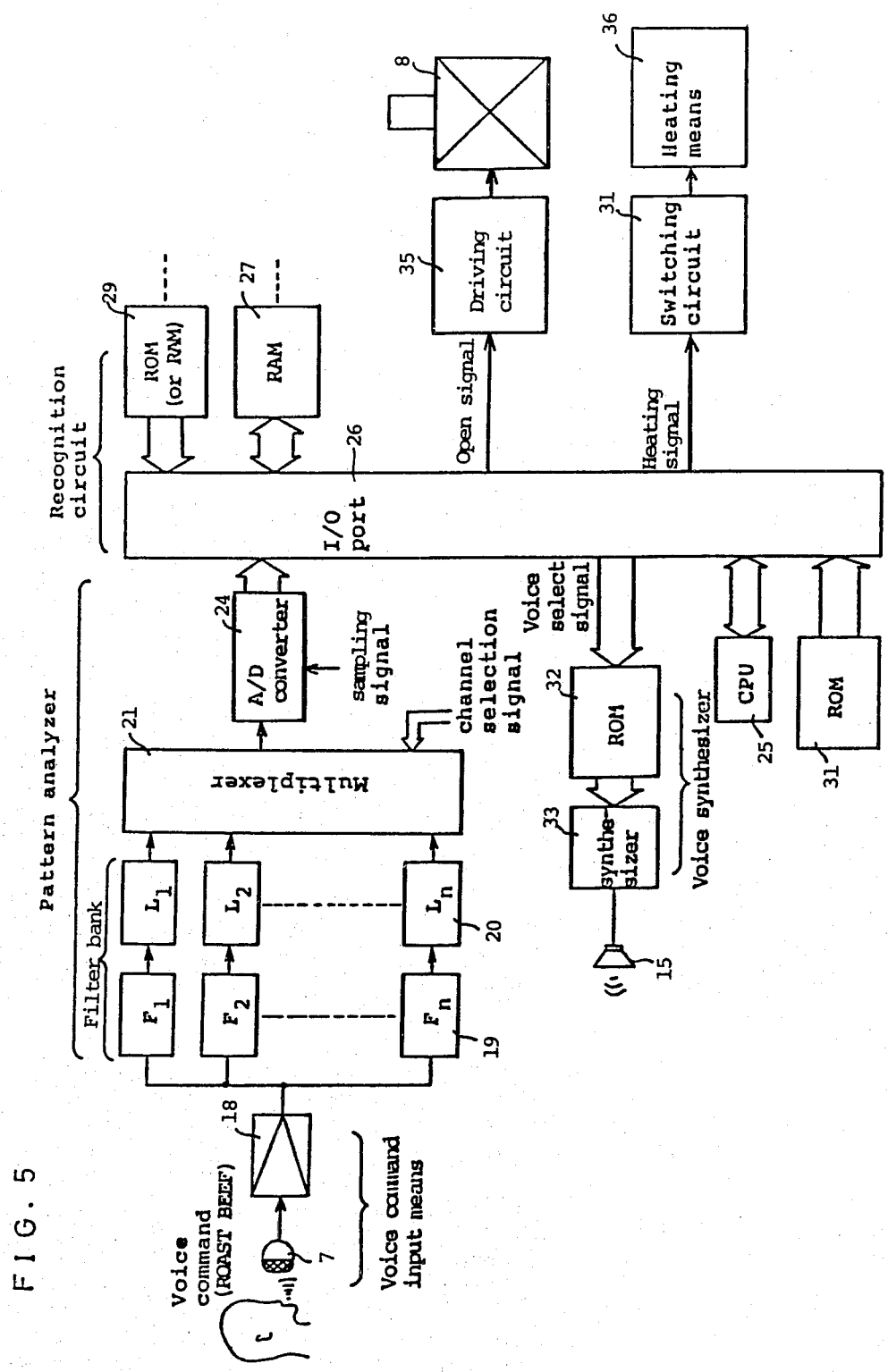
FIG. 5 is a circuit block diagram of the embodiment.

FIG. 5 is a block diagram of an example embodying the present invention.

Figure 6:
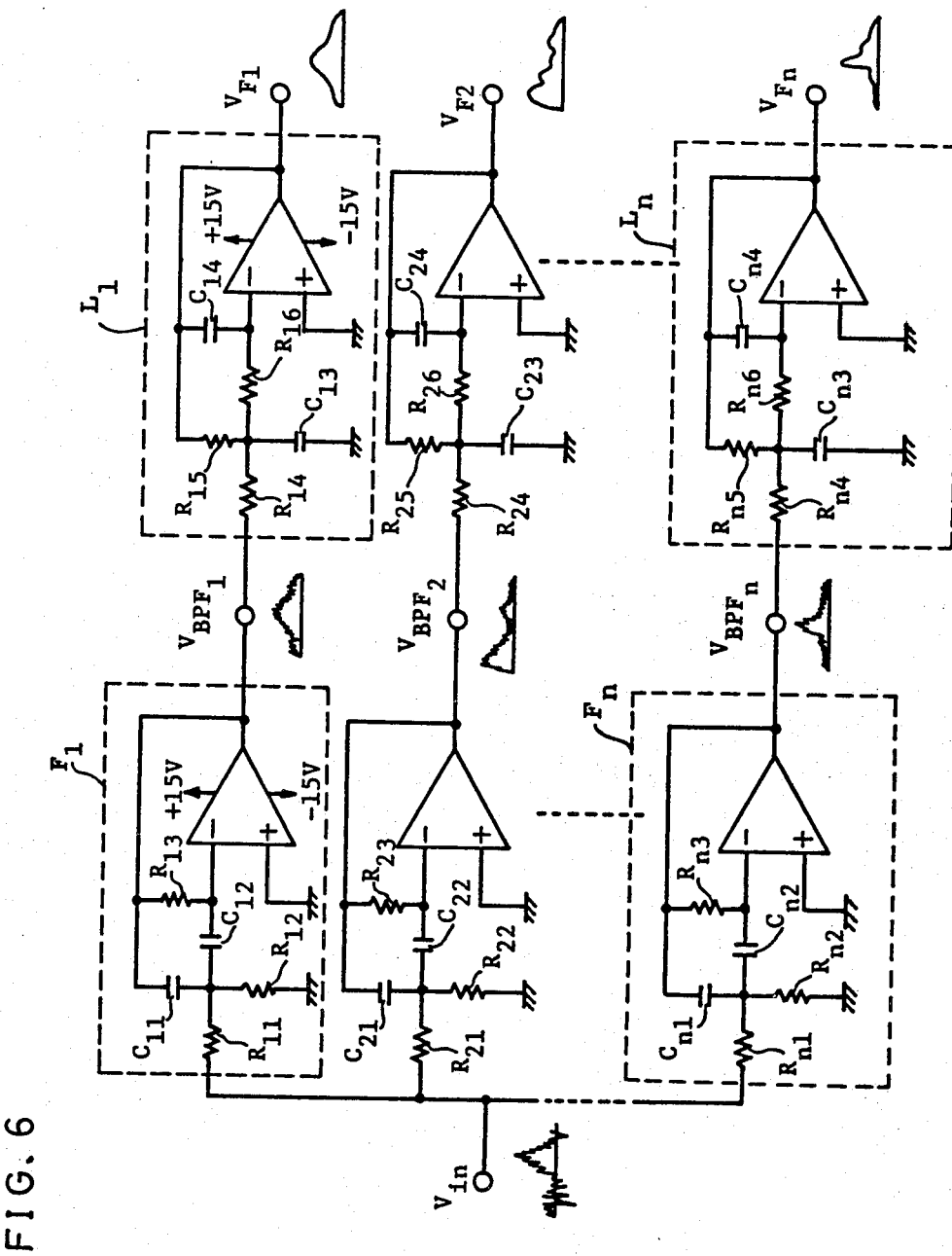
FIG. 6 is a circuit diagram of an example of a filter bank of the embodiment.
Figure 7:
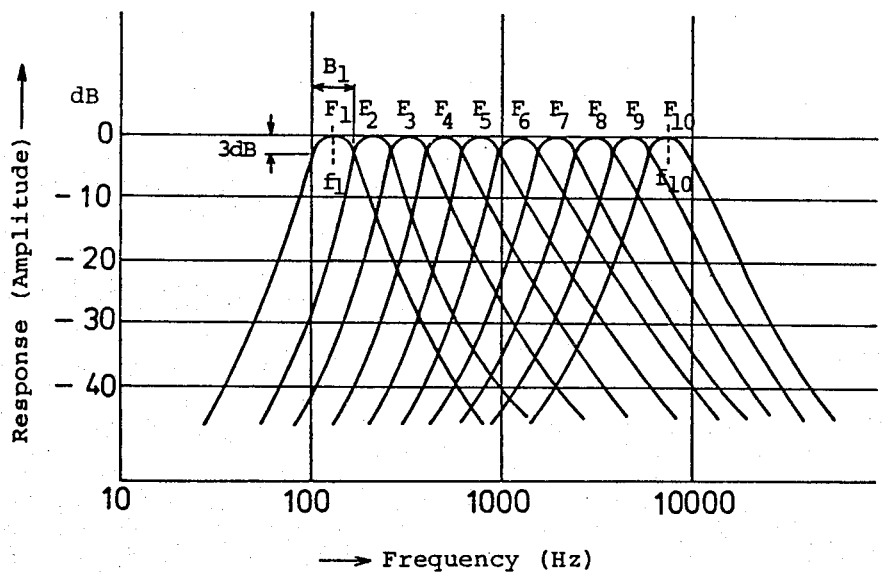
FIG. 7 is a frequency characteristic graph of band-pass filters of the filter bank of FIG. 6.

In FIG. 5, the microphone 7 receives the user's voice command and converts the voice command to a voice electric signal, which is amplified by an amplifier 18. The voice electric signal is then led to a filter bank comprising a plurality of band-pass filters 19 and a low-pass filter 20. FIG. 6 shows an example of an actual circuit structure of such filter bank, which comprises multiple feed-back type band-pass filters $F_1, F_2, \ldots, F_n$ and multiple feed-back type low-pass filters $L_1, L_2, \ldots, L_n$. The band-pass filters $F_1$ to $F_n$ have frequency characteristics shown in FIG. 7, wherein a frequency range of 100 Hz to 10 KHz is covered by ten band-pass filters, wherein the center frequencies $f_j$ and the band width $B_j (j=1, 2, \ldots, 10)$ are designed as shown in FIG. 7.

Figure 8:
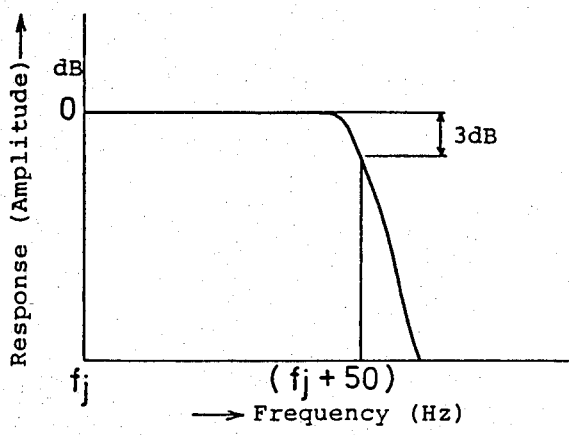
FIG. 8 is a frequency characteristic graph of a low pass filter of the filter bank of FIG. 6.
Figure 9:
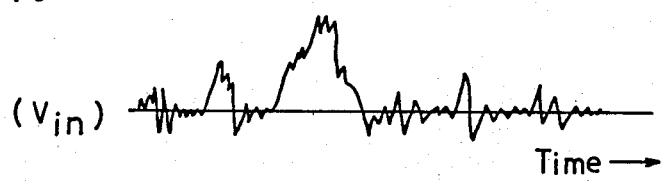
FIGS. 9(a), 9(b) and 9(c) are frequency characteristic graphs of various part of the filter bank.
Figure 9:
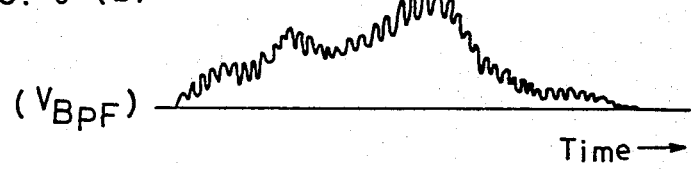
Figure 9:
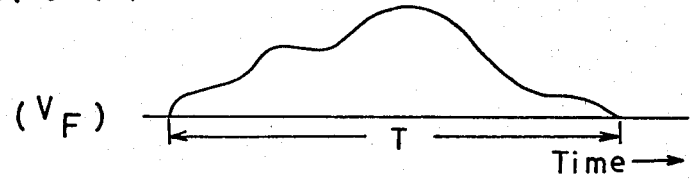
Figure 10:
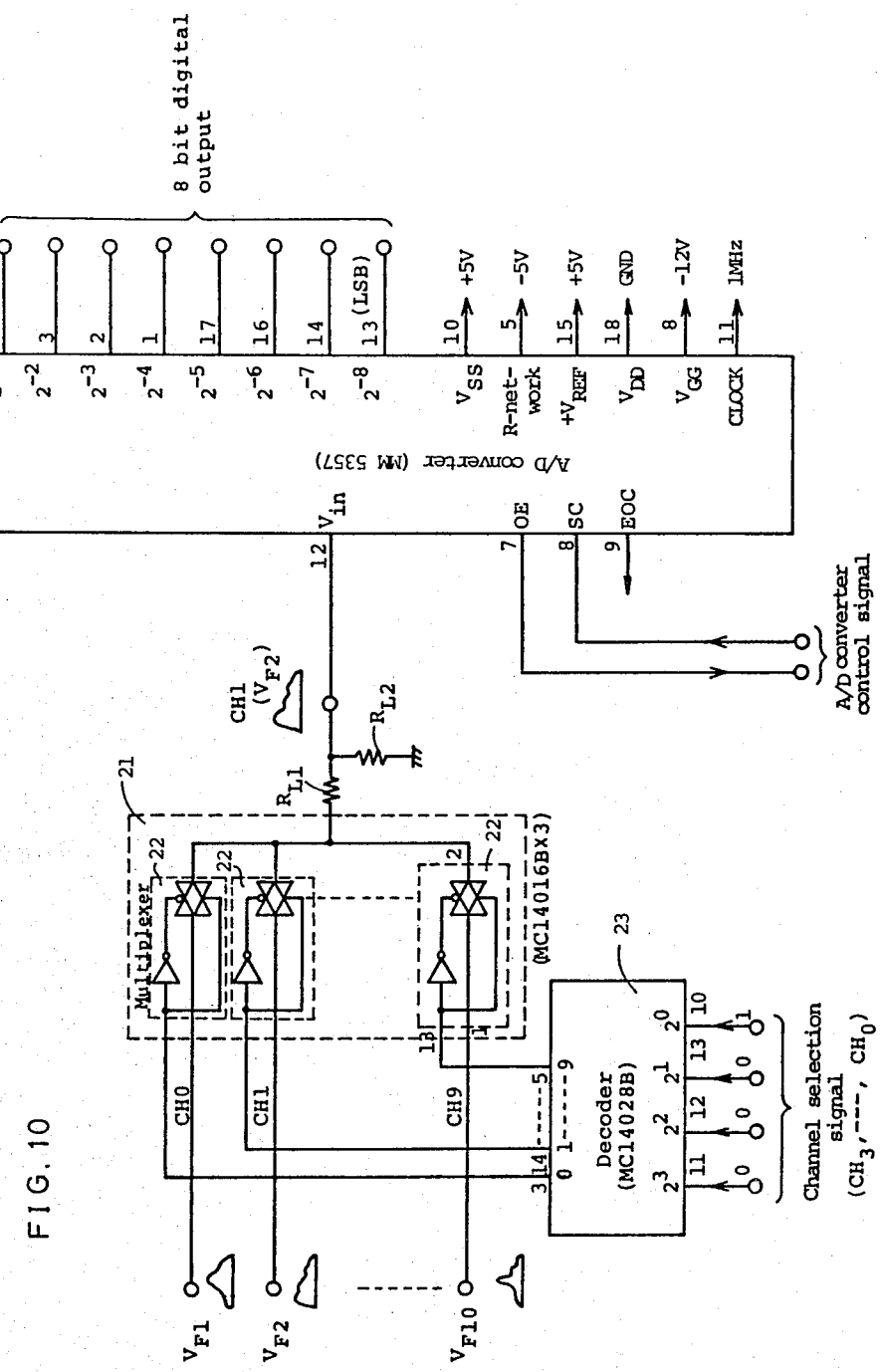
FIG. 10 is a circuit diagram of an analogue multiplexer and A/D converter.

The low-pass filters 20 have the cut-off frequencies as shown in FIG. 8. In the example, the low-pass filters 20 are of multiple feed-back type having the cut-off frequencies of 50 Hz. By using such filter banks, the command voice $V_{in}$ is analyzed into data in ten frequency bands. FIG. 9(a) shows the voice waveform $V_{in}$ and FIG. 9(b) shows waveform of the output signal $V_{BPF}$ of a band-pass filter. As shown in FIG. 9(b), the waveform of the signal $V_{BPF}$ contains pitch of the voice, and therefore, the signal $V_{BPF}$ is passed through the low-pass filter 20 to remove the pitch of voice to obtain a filter bank output $V_F$ of smoothed envelope waveform as shown by FIG. 9(c). The larger the number n of the filters, the better the analysis of the voice pattern can be made. However, too much number of the filters make the cost and bulk of the apparatus too large, and therefore, a reasonable number for a home use utensil should be selected in considering a suitable recognition ability and speed of controlling part from both aspects of software and hardware. For the case that a below-mentioned 8-bit micro-processor is used for its control part, 10 filters each for the band-pass filters and low-pass filters are empirically found suitable or effective. The output signal of the filter bank is then lead into the analog multiplexer 21, and the outputs of the low-pass filters $L_1, L_2, L_3, \ldots, L_n$ are in turn sent to the multiplexer 21, and the output of the multiplexer 21 is, as shown in FIG. 10, comprises ten analog switches 22, which are consisting of, for example, three C-MOS devices of MC14016B (a four circuits analog switch) produced by Motorola Inc. Channel switching is operated by channel selection signal sent from the CPU in the main control unit. A decoder 23 decodes the 4-bits binary type channel selection signal into 10-bits signal to be given to the multiplexer 21. The decoder 23 is structured by using a BCD to Decimal Decoder of MC14028B produced by Motorola Inc. For example, when a "0001" signal is input, the decoder 23 outputs a signal for channel 1. Accordingly, the signal $V_{F2}$ is sent to the output terminal of the analog multiplexer 21. By switching the channel selection signal in the similar manner, outputs of ten filters of the filter bank are issued in turn at the output terminal of the multiplexer 21.

Then, the output signals of the filter bank are sent to the A/D converter 24 and converted into 8-bits digital signals. The A/D converter 24 consists of, for example a monolithic A/D converter MM 5357 of NS Inc. By adjusting the load resistors $R_{L1}$ and $R_{L2}$, the analog input signal is adjusted to be within ±5 V. The input terminal SC of the A/D converter 24 receives a start conversion signal, by which the filter bank output signals are sampled with a period of between 1 and 10 m sec. With such period, enough pattern characteristic recognition can be made when the voice waveform is handled as envelope signals. The input terminal EOC receives an end-of-conversion signal, and the output terminal OE outputs an output-enable signal having effective timing of the 8-bits digital output signal. The CPU 25 in turn samples the filter bank outputs by means of the SC signal, sweepingly outputting the channel selection signal, and converts into 8-bits digital data, and the abovementioned processing is made by using the OE signal as monitor.

FIG. 11 shows a block diagram of one example of such CPU system 25, constituted by using an 8-bits micro-processor, Intel 8080. The voice data (8-bits digital signal) is written into the input pattern memory 27 through the I/O port 26 (shown in FIG. 5). That is, when the mode is switched to a data reading mode by means of controlling by the multiplexer 28, the 8-bits voice data issued from the A/D converter 24 is sent to the bi-directional data bus 26. The voice data is once written into the input pattern memory 27 by a control signal from the CPU 25. By means of such process, the voice input data are analyzed in every frequency band, is sampled by the multiplexer 21, and then stored in the input pattern memory 27.

Then by detecting the end of the voice input signal, the CPU 25 counts the time length T (FIG. 9(c)) of this voice input pattern, and normalizes this time length by utilizing known dynamic programming (DP), in which DP process the input voice pattern is compared to the reference pattern registered in the memory 29, and partial expansion or partial compression is carried out until the voice input pattern most coincides with the reference pattern, so that a reference pattern with highest affinity with the input pattern is selected.

For more information on the DP technique applied for the voice recognition, reference is made to, for example IEEE Transactions on Acoustics, Speech, and Signal processing, Vol. ASSP-26, No. 1, pp. 43–49, February 1978, and Vol. ASSP-27, No. 6, pp. 588–595, December 1980.

By means of the abovementioned recognition process, the voice input signal is defined as coincided with the selected reference pattern, and therefore, a specified output signal is provided to an output control circuit 30. In response, a door opening signal, a voice select signal for synthesizing voice, the aforementioned channel selection signal and sampling signal SC are issued with predetermined timings.

The memory 31 is a ROM which stores a control program of the CPU 25. In the abovementioned example, the reference voice pattern is registered in the ROM 29 for recognition of voice command of an unlimited number of users. Besides the abovementioned example, a modified example can be made by replacing the ROM 29 by a RAM, so that voice commands of one or several limited users is preliminarily registered in the RAM 29 in order to easily obtain recognition of the user's voice with the stored reference pattern. In case such structure is employed, a single RAM can be used in place of the input pattern memory 27 and the reference pattern memory 29.

By the abovementioned structure and process, the voice command "OPEN DOOR" is recognized, and the CPU 25 issues, based on the voice select signal, an address signal for reading out an address for the signal to synthesize "DOOR OPEN?" in the ROM 32. Therefore, the voice data for the "DOOR OPEN?" is sent to the voice synthesizer 33, which then makes the synthesized voice signal "DOOR OPEN?" issue from the speaker 15. Such voice synthesizer 33 is available in the market, as a one chip synthesizer utilizing known PARCOR synthesizing method for the voice synthesizing part.

The control unit then turns into the second recognition mode, and waits for the user's second voice command of "YES", or "NO". The user's command is recognized in the similar process as that of the recognition of the voice command "OPEN DOOR", and when the user's second voice command is "YES" the open signal is issued to a driving circuit 35 to drive the solenoid planger 8. Then the door 2 is opened by the action of the solenoid planger 8 as shown FIG. 2(b). On the other hand when the user's second voice command is "NO" or in case no command is given during a preset interval the recognized command "OPEN DOOR" is canceled.

In addition, designing the circuit instead of recognizing the voice command "OPEN DOOR" as combined words, to recognize the command as two discrete words such as "OPEN" and "DOOR". That is, when the voice commands "OPEN" and "DOOR" are registered in the ROM 29 separately, and that a short interval is disposed between the two words, the probability of erroneous recognition can be reduced. Taking abovementioned design of recognizing the voice command separately, a correct recognition rate of established system of the heating apparatus can be improved not by means of the circuit improvement but by means of the soft-ware improvement.

In FIG. 5, a load 36 is, for example, an electric heating wire or a magnetrone as a heating means connected to the switching means 37. The heating means 26 is operated by a control signal of the CPU 25 in accordance with a predetermined heating pattern.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What is claimed is:

1. A heating apparatus comprising:
   (a) an enclosure case having therein a heating chamber in which an object to be heated is to be placed,
   (b) a heating means for generating a heating energy to be fed into said heating chamber,
   (c) a door mounted at an opening of said heating chamber for opening and closing the heating chamber,
   (d) a locking means for locking said door when the door is closed, and
   (e) a releasing means for releasing a locking state of said locking means, to open said door,
   (f) a voice command input means including a microphone for transforming a user's voice command into a command input signal,
   (g) a pattern analyzer for analyzing said command input signal by (1) dividing it into input pattern signals, each input pattern signal being associated with a predetermined frequency band, (2) subsequently sampling said input pattern signals and (3) carrying out A/D conversion thereof to produce pattern-analyzed digital data,
   (h) an input pattern memory for memorizing said pattern-analyzed digital data in a form of time sequential patterns,
   (i) a reference pattern memory for storing time sequential reference pattern data as reference patterns,
   (j) a recognition processing circuit for comparing said pattern-analyzed digital data stored in said input pattern memory with said time sequential reference pattern data stored in said reference pattern memory, and for providing a signal indicative of the affinity degree of the comparison, and
   (k) an output control circuit for producing at least a predetermined control signal when said affinity degree is higher than a predetermined degree of affinity,
   said reference pattern memory having an address part for storing reference pattern data corresponding to a voice command for opening said door, the output control circuit being for issuing a control signal to actuate said releasing means thereby releasing said locking means and opening said door, when an affinity degree determined by said signal from said recognition processing circuit after comparing the pattern-analyzed digital data stored in said input pattern memory with said reference pattern data corresponding to said voice command door opening said door, is higher than said predetermined degree of affinity.

2. A heating apparatus in accordance with claim 1, wherein
   said microphone is positioned within the enclosure case, has a sharp directivity and is disposed in such a manner that a directivity zone of said microphone lies outside the space wherein the door moves to open.

3. In a heating apparatus comprising:
   (a) an enclosure case having therein a heating chamber in which a heating object is to be placed,
   (b) a heating means for generating a heating energy to be fed in said heating chamber,
   (c) a door mounted at an opening of said heating chamber to open and close the heating chamber,
   (d) a locking means to lock said door when the door is closed,
   (e) a releasing means to release a locking state of said locking means, for opening said door, and
   (f) a speech recognition circuit, the improvement wherein said speech recognition circuit comprises:
   (g) a voice command input means including a microphone for transforming user's voice commands into command input signals,
   (h) a pattern analyzer for frequency-analyzing said command input signals to divide them into input pattern signals for a predetermined number of frequency bands, subsequently sampling said input pattern signals, and carrying out A/D conversion thereof to produce pattern-analyzed digital data,
   (i) an input pattern memory for memorizing said pattern-analyzed digital data in a form of time sequential patterns,
   (j) a reference pattern memory for storing time sequential reference pattern data as reference patterns,
   (k) a recognition processing circuit for comparing said pattern-analyzed digital data stored in said input pattern memory with said time sequential reference pattern data stored in said reference pattern memory, and for issuing a signal of an affinity degree of the comparison, and
   (l) an output control circuit for producing a predetermined control signal when said affinity degree determined by said signal from said recognition processing circuit is higher than a predetermined affinity degree,
   said reference pattern memory comprising an address part which contains reference pattern data corresponding to a voice command for opening said door,
   said output control circuit issuing a control signal to actuate said releasing means thereby releasing said locking means and opening said door, when an affinity degree determined by said signal from said recognition processing circuit after comparing pattern-analyzed digital data stored in said input pattern memory with said reference pattern data corresponding to said voice command for opening said door, is higher than said predetermined affinity degree.

4. An improvement according to claim 3, wherein said microphone built in said enclosure case has a sharp directivity and is disposed in such a manner that a directivity zone of said microphone lies outside the space wherein the door moves to open.

* * * * *